US009662941B2

(12) United States Patent
Yamakawa

(10) Patent No.: US 9,662,941 B2
(45) Date of Patent: May 30, 2017

(54) PNEUMATIC TIRE

(71) Applicant: The Yokohama Rubber Co., LTD., Minato-ku, Tokyo (JP)

(72) Inventor: Takahiro Yamakawa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/648,686

(22) PCT Filed: Mar. 6, 2014

(86) PCT No.: PCT/JP2014/055795
§ 371 (c)(1),
(2) Date: May 29, 2015

(87) PCT Pub. No.: WO2014/136883
PCT Pub. Date: Sep. 12, 2014

(65) Prior Publication Data
US 2015/0273951 A1    Oct. 1, 2015

(30) Foreign Application Priority Data

Mar. 6, 2013  (JP) ................................ 2013-044635

(51) Int. Cl.
*B60C 11/12*  (2006.01)
*B60C 11/13*  (2006.01)
(Continued)

(52) U.S. Cl.
CPC .......... *B60C 11/04* (2013.01); *B60C 11/0304* (2013.04); *B60C 11/0306* (2013.04);
(Continued)

(58) Field of Classification Search
CPC . B60C 11/1369; B60C 11/0309; B60C 11/12; B60C 11/1263; B60C 11/1353;
(Continued)

(56) References Cited

U.S. PATENT DOCUMENTS 6,705,367 B1   3/2004  Kobayashi
2010/0084061 A1*  4/2010  Kiwaki ................... B60C 11/01
152/209.18
(Continued)

FOREIGN PATENT DOCUMENTS

EP    2 233 321    9/2010
JP    01-309806 A  * 12/1989
(Continued)

OTHER PUBLICATIONS

Machine translation for Japan 2001-219718 (no date).*
International Search Report for International Application No. PCT/JP2014/055795, dated May 20, 2014, 2 pages, Japan.

*Primary Examiner* — Steven D Maki
(74) *Attorney, Agent, or Firm* — Thorpe North & Western

(57) ABSTRACT

Provided is a pneumatic tire with a tread pattern that includes two first circumferential main grooves, shoulder land portions, shoulder lug grooves, shoulder sipes, and narrow circumferential grooves, the shoulder lug grooves being closed off midway in the region of the shoulder land portions without connecting with the first circumferential main grooves and including first regions and second regions that are disposed in the regions closer to the first circumferential main grooves than the first regions and have a groove depth that is less than that of the first regions. The shoulder sipes are connected with the second regions and extend toward the first circumferential main grooves. The narrow circumferential grooves extend in the tire circumferential direction and have a groove width that is less than the groove width of the shoulder lug grooves. The narrow circumferential grooves intersect with the second regions of the shoulder lug grooves.

18 Claims, 10 Drawing Sheets

(51) Int. Cl.
*B60C 11/04* (2006.01)
*B60C 11/03* (2006.01)
*B60C 11/11* (2006.01)

(52) U.S. Cl.
CPC ........... *B60C 11/0309* (2013.04); *B60C 11/11* (2013.01); *B60C 11/1218* (2013.04); *B60C 11/1263* (2013.04); *B60C 11/1353* (2013.04); *B60C 11/1369* (2013.04); *B60C 2011/039* (2013.04); *B60C 2011/0346* (2013.04); *B60C 2011/0348* (2013.04); *B60C 2011/0351* (2013.04); *B60C 2011/0353* (2013.04); *B60C 2011/0365* (2013.04); *B60C 2011/0369* (2013.04); *B60C 2011/0381* (2013.04); *B60C 2011/0393* (2013.04); *B60C 2011/0395* (2013.04); *B60C 2011/1209* (2013.04); *B60C 2011/1213* (2013.04); *B60C 2011/1361* (2013.04)

(58) Field of Classification Search
CPC ............. B60C 11/13; B60C 2011/0369; B60C 2011/0381; B60C 2011/0351; B60C 2011/0348; B60C 2011/0393; B60C 2011/0395
See application file for complete search history.

(56) References Cited

U.S. PATENT DOCUMENTS

| | | | |
|---|---|---|---|
| 2012/0085471 A1* | 4/2012 | Horiguchi | B60C 11/0306 152/209.9 |
| 2012/0152421 A1* | 6/2012 | Stuckey | B60C 11/0306 152/209.16 |
| 2012/0168050 A1* | 7/2012 | Terashima | B60C 11/0083 152/209.25 |
| 2012/0227881 A1* | 9/2012 | Kudo | B60C 11/0083 152/209.14 |
| 2013/0167996 A1* | 7/2013 | Oda | B60C 11/04 152/209.18 |

FOREIGN PATENT DOCUMENTS

| | | |
|---|---|---|
| JP | 2001-039125 | 2/2001 |
| JP | 2001-219718 | 8/2001 |
| JP | 3482033 | 12/2003 |
| JP | 2007-091167 | 4/2007 |
| JP | 2010-247711 | 11/2010 |

* cited by examiner

PNEUMATIC TIRE

TECHNICAL FIELD

The present technology relates to a pneumatic tire provided with a tread pattern.

BACKGROUND

All-season tires used year-round must be capable of handling various types of road surface conditions, such as dry, wet, and snowy. A tire comprising, for example, two outer circumferential main grooves disposed to the outside in a tire width direction and a shoulder land portion formed in regions to the outside of the outer circumferential main grooves in a tire circumferential direction is known in the art as a tire possessing the ability to handle various types of road surface conditions (see Japanese Patent No. 3482033B). The tire of Japanese Patent No. 3482033B is provided with shoulder lug grooves in the regions of the shoulder land portions that extend from the outer side in the tire width direction to the outer circumferential main grooves and form a plurality of land portion blocks. Shallow-grooved regions in which the groove depth is shallow are formed in the shoulder lug grooves in the regions closer to the outer circumferential main grooves, and shoulder sipes that connect to the outer circumferential main grooves are formed in these shallow grooved regions.

In accordance with the tire of Japanese Patent No. 3482033B, the shoulder sipes in the shallow grooved regions close in response to external forces acting in the tire circumferential direction, allowing block rigidity to be maintained, and external forces acting in the tire width direction mitigate block rigidity, allowing for increased ground contact and maintaining wet steering stability.

An all-season tire preferably exhibits wear resistance on dry road surfaces, and steering stability on wet and snowy road surfaces. However, the tire disclosed in Japanese Patent No. 3482033B does not exhibit a sufficient balance between these various capabilities.

SUMMARY

The present technology provides a pneumatic tire that exhibits a superior balance between wear resistance on dry road surfaces and wet steering stability and steering stability on snow.

An aspect of the present technology is a pneumatic tire provided with a tread pattern in a tread section, wherein the tread pattern includes:

two first circumferential main grooves parallel to a tire circumferential direction, the two first circumferential main grooves being disposed on both sides of a centerline of the tire in a tire width direction;

shoulder land portions formed in the regions outside the first circumferential main grooves in the tire width direction;

shoulder lug grooves provided in the regions of the shoulder land portions, the shoulder lug grooves extending from outer sides in the tire width direction toward the first circumferential main grooves, the shoulder lug grooves being closed off midway without connecting with the first circumferential main grooves, and the shoulder lug grooves including first regions and second regions, the second regions disposed in the regions closer to the first circumferential main grooves than the first regions and having a shallower groove depth than the first regions;

shoulder sipes formed in the regions of the shoulder land portions, the shoulder sipes being connected to the second regions of the shoulder lug grooves, and the shoulder sipes extending toward the first circumferential main grooves; and narrow circumferential grooves formed in the regions of the shoulder land portions, the narrow circumferential grooves extending in the tire circumferential direction, and the narrow circumferential grooves having a narrower groove width than the shoulder lug grooves;

the narrow circumferential grooves intersecting with the second regions of the shoulder lug grooves.

With respect to the ground contact width of the regions of the shoulder land portions in the ground contact width of the tire, the length in the tire width direction of land portions between the closed ends of the shoulder lug grooves and the edges of the first circumferential main grooves is preferably from 10 to 25%, the length in the tire width direction of the second regions in the shoulder lug grooves is preferably from 35 to 65%, and the length in the tire width direction of the first regions of the shoulder lug grooves is preferably from 20 to 45%.

It is preferable that the shoulder lug grooves further include closed wall portions extending so as to connect the floors of the grooves in the second regions and the tread surface, and stepped portions connecting the floors of the grooves in the first regions and the floors of the grooves in the second regions, and the closed wall portions and the stepped portions are each inclined from 10 to 60° outward in the tire width direction with respect to a direction opposite the direction of the normal line of the tread surface.

The shoulder sipes preferably have a sipe depth that is less than the groove depth of the first regions of the shoulder lug grooves and greater than the groove depth of the second regions.

It is preferable that the shoulder sipes have a sipe depth greater than the groove depth of the second regions of the shoulder lug grooves, and outer ends of the shoulder sipes in the tire width direction are formed by extending into at least a part of the regions of the inner regions of the shoulder lug grooves.

The sipe depth of the shoulder sipes may progressively decrease from the regions closer to the first circumferential main grooves toward the shoulder lug grooves.

The groove depth of the second regions of the shoulder lug grooves is preferably less than the groove depth of the first circumferential main grooves.

The length of the second regions of the shoulder lug grooves in the tire width direction is preferably from 30 to 70% of the length of the shoulder lug grooves in the tire width direction.

The groove depth of the narrow circumferential grooves is preferably equal to or less than the groove depth of the first regions of the shoulder lug grooves.

It is preferable that the tread pattern further comprise second circumferential main grooves disposed between the two first circumferential main grooves and the second circumferential main grooves defining a center land portion, the centerline of the tire passing therethrough, and a plurality of lug grooves traversing the region of the center land portion and the regions of two intermediate land portions defined by the first circumferential main grooves and the inner circumferential main grooves to form a plurality of land portion blocks in the region of the center land portion and the regions of the intermediate land portions;

at least one of the lug grooves provided in the region of the center land portion and the lug grooves provided in the regions of the intermediate land portions include first lug groove regions being a part of regions in the direction of extension and second lug groove regions connecting with the first lug groove regions and the second lug groove regions are the other regions in the direction of extension; and the first lug groove regions have a narrower groove width than the second lug groove regions and a shallower groove depth than the second lug groove regions.

The first lug groove regions of the lug grooves in the region of the center land portion preferably have a groove length that is from 30 to 80% of the groove length of the lug grooves.

The shoulder lug grooves preferably have a groove width that is greater than the widest groove width of the second lug groove region of the lug grooves in the region of the center land portion and the second lug groove regions of the lug grooves in the intermediate land portions.

The tire according to the present technology exhibits a superior balance between wear resistance on dry road surfaces and wet steering stability and steering stability on snow.

DETAILED DESCRIPTION

The following is a detailed description of the pneumatic tire according to the present technology.

Figure 1:
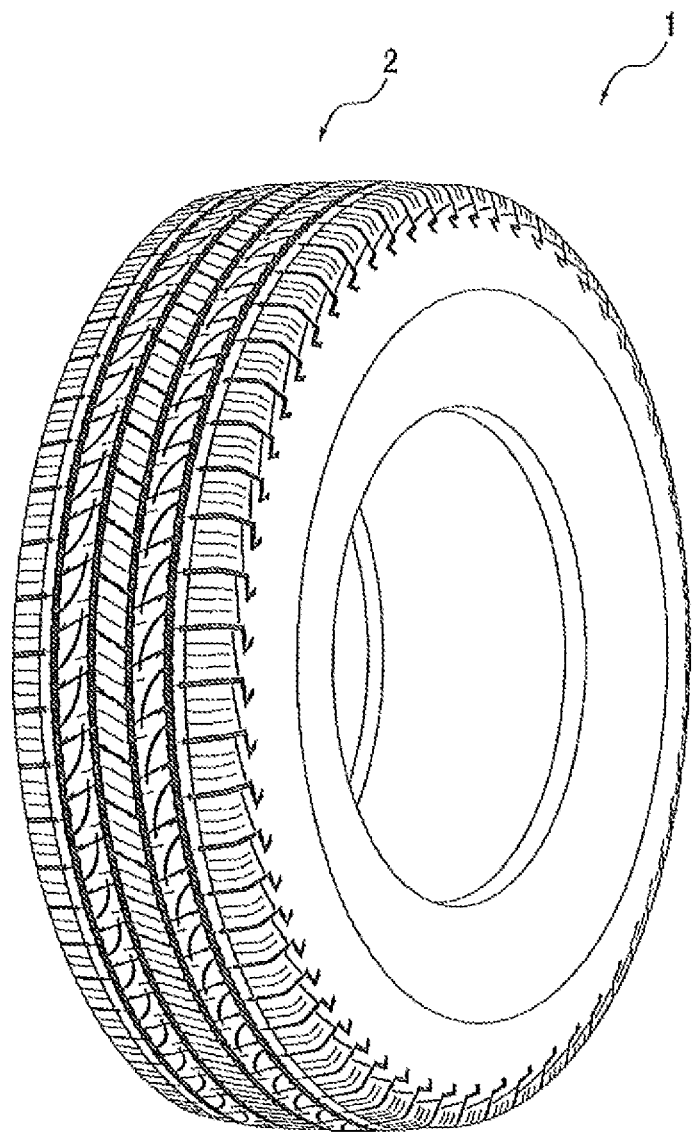
FIG. 1 is a visual appearance view of an entire tire of an embodiment of the present technology.

FIG. 1 illustrates the exterior of a pneumatic tire 1 of an embodiment of the present technology.

The pneumatic tire (hereafter referred to as a tire) 1 is a tire for a passenger vehicle.

The structure and rubber members of the tire 1 of the present technology may be either publicly known or novel, and are not particularly limited in the present technology.

Figure 2:
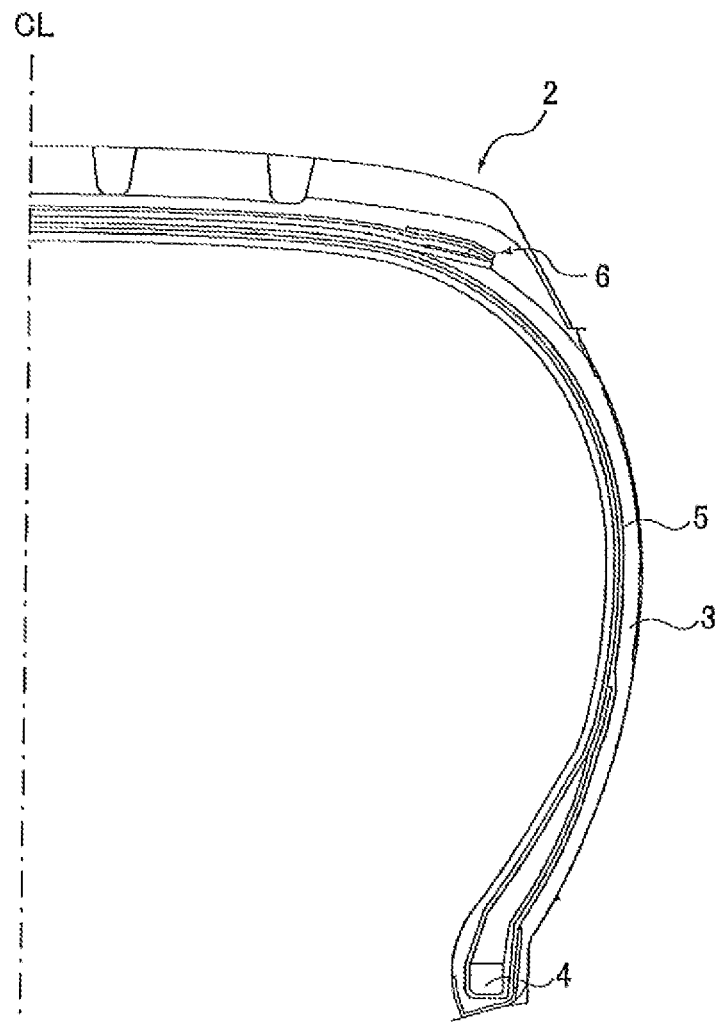
FIG. 2 is a half cross-sectional view of a portion of the tire illustrated in FIG. 1.

As illustrated in FIG. 2, the tire 1 includes a tread portion 2, a side wall 3, a bead 4, a carcass layer 5, and a belt layer 6. FIG. 2 is a half cross-sectional view illustrating a portion of the tire 1. The tire 1 also includes an inner liner layer and the like that are not illustrated in the drawings. The side wall 3 and the bead 4 are each formed as pairs that are arranged on both sides in the tire width direction so as to sandwich the tread portion 2.

The tread portion 2, the bead 4, the belt layer 6, the inner liner, and the like may be either publicly known or novel, and are not particularly limited in the present technology.

Figure 3:
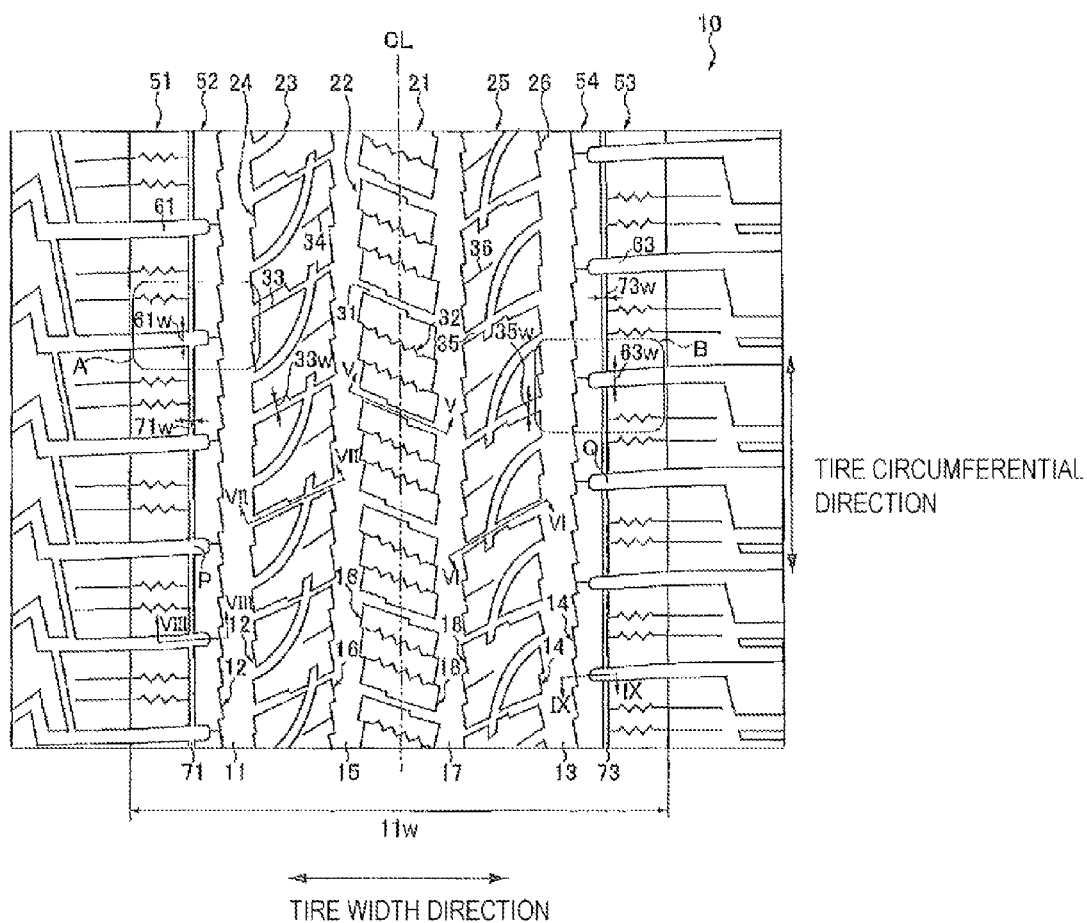
FIG. 3 is a view of the tread pattern of the tire illustrated in FIG. 1 spread flat for ease of illustration.

The tread pattern 10 characterizing the present technology as illustrated in FIG. 3 is formed in the tread portion 2 of the tire 1 according to the present technology. FIG. 3 is a plan view of the tread pattern 10 of the tire 1 of the present technology spread flat for ease of illustration. The tire 1 having the tread pattern 10 may be suitably used as a tire for a passenger vehicle. The dimensions of the various elements of the tire in the following description are examples of values used in tires for passenger vehicles.

The tire 1 of the present technology has a predetermined tire mounting orientation when mounted to the outside of a vehicle. The label CL in FIG. 3 indicates the centerline of the tire. The tire 1 is mounted on a vehicle with the region of the tread pattern 10 to the left of the centerline of the tire CL as seen in FIG. 3 facing inward and the region of the tread pattern 10 to the right of the tire centerline CL as seen in FIG. 3 facing outward; the tire may also be mounted on a vehicle with the reverse orientation. Information regarding mounting orientation is displayed, for example, on a surface of the tire, such as a side wall surface, in the form of letters, symbols, or the like.

While the tire 1 is mounted on a vehicle, the tread pattern 10 comes into contact with the road surface in a region of the tire width direction indicated by a ground contact width 11w. The ground-contacting ends are determined as described below. The ground-contacting ends are end portions in the tire width direction of a ground-contacting surface when the tire 10 is brought into contact with a horizontal surface under conditions in which the tire 10 is fitted to a standard rim and inflated to a standard inner pressure, and a load to be applied is set to 88% of a standard load. Herein, "standard rim" refers to an "application rim" as defined by the Japan Automobile Tyre Manufacturers Association Inc. (JATMA), a "design rim" as defined by the Tire and Rim Association, Inc. (TRA), or a "measuring rim" as defined by the European Tyre and Rim Technical Organisation (ETRTO). "Standard inner pressure" refers to "maximum air pressure" as defined by JATMA, the maximum value in "tire load limits at various cold inflation pressures" as defined by TRA, or "inflation pressure" defined by ETRTO. The standard inner pressure is, for example, 180 kPa if the tire is for a passenger vehicle. "Standard load" refers to "maximum load resistance" defined by JATMA, the maximum value in "tire load limits at various cold inflation pressures" defined by TRA, or "load capacity" defined by ETRTO.

The tire width direction in the present technology refers to the direction of the central axis of rotation of the tire 1, and the tire circumferential direction refers to a direction in which the rotating surface of the tread surface rotates, the rotating surface being formed when the tire 1 rotates around the central axis of rotation of the tire. The above directions are expressed in FIG. 3. The tire rotation direction of the tread pattern 10 of the present technology is not particularly limited.

The tire 1 of the present technology may have a pitch with the same dimensions as the tread pattern 10, illustrated in FIG. 3, arranged in the tire circumferential direction, or the tire 1 may have a plurality of types of pitches with different dimensions from the tread pattern 10 arranged in the tire circumferential direction to allow for a pitch variation.

The tread pattern 10 comprises two outer circumferential main grooves 11, 13 (first circumferential main grooves) that are parallel to the tire circumferential direction and are disposed outside of the tire centerline CL interposed therebetween in the tire width direction, shoulder land portions 51, 53 formed in the regions outside the outer circumferential main grooves 11, 13 in the tire width direction, shoulder lug grooves 61, 63, shoulder sipes 62, 64, and narrow circumferential grooves 71, 73.

(Circumferential Main Grooves)

The tread pattern 10 preferably further comprises two inner circumferential main grooves 15, 17 (second circumferential main grooves) disposed between the two outer circumferential main grooves 11, 13, the inner circumferential main grooves 15, 17 defining a center land portion 21 through which the tire centerline CL passes.

Figure 7:
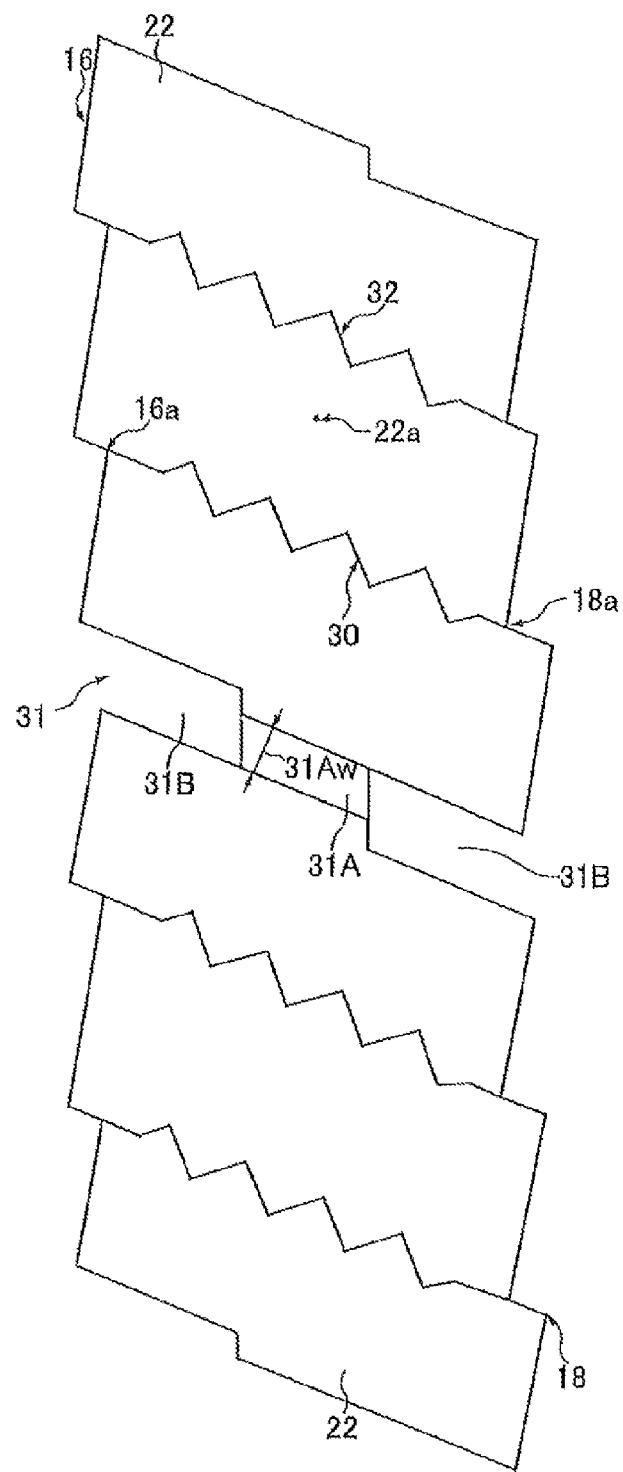
FIG. 7 is a magnified view of the tread pattern illustrated in FIG. 3 focusing on land portion blocks in a center land portion.

The circumferential main grooves 11, 13, 15, and 17 preferably includes a pair of main groove walls 12 and 12, 14 and 14, 16 and 16, and 18 and 18 that extend in the tire circumferential direction in a zig-zagging pattern, respectively. This increases the edge component of the tread surface, improving wet steering stability and steering stability on snow. Either or both of the circumferential main grooves 11, 13 and the circumferential main grooves 15, 17, may include zigzagging main groove walls. Each of the main groove walls 12, 14, 16, 18 has a shape comprising an alternating series of wall surfaces that are prominently inclined with respect to the tire circumferential direction and wall surfaces having an angle that is less inclined with respect to the tire circumferential direction than that of the first wall surfaces. Of these, the two main groove walls 16, 18 defining the center land portion 21, to be described hereafter, comprise bend points 16a, 18a that bend inward toward the center land portion 21 (i.e., the centerline of the tire), respectively, as illustrated in FIG. 7. FIG. 7 is a magnified view of the tread pattern 10 focusing on land portion blocks 22 in a center land portion 21. The two main groove walls 16, 18 are preferably formed so that one land portion block 22 is provided with two bend points 16a, 18a each. This allows both of two sipes 32, 30, to be described hereafter, to be provided so as to connect a bend point 16a and a bend point 18a.

The groove depths and groove widths of the circumferential main grooves 11, 13, 15, 17 are equal, but may be different in a different embodiment. If the groove widths of the circumferential main grooves 11, 13, 15, 17 vary along the tire circumferential direction, the term "groove width" refers to the average groove width along the entire circumference of the tire circumferential direction, or, for example, the average groove width for ten different locations along the tire circumferential direction. The total value of the groove widths of the circumferential main grooves 11, 13, 15, 17 is preferably from 15 to 25% of the ground contact width 11w for the sake of striking a balance between wet steering stability, steering stability on snow, and wear resistance.

(Shoulder Land Portions)

As illustrated in FIG. 3, shoulder lug grooves 61, 63 that extend from the outside in the tire width direction toward the adjacent outer circumferential main grooves 11, 13 are provided in the regions of the shoulder land portions 51, 53.

(Shoulder Lug Grooves)

The shoulder lug grooves 61, 63 are closed off midway without connecting with the outer circumferential main grooves 11, 13, so that the shoulder land portions 51, 53 form continuous land portions 52, 54 that continuously extend in the tire circumferential direction. In the present description, the term "continuous land portion" refers to a plurality of land portions that are divided in the tire circumferential direction only by sipes in the tread surface, and are not divided in the tire circumferential direction by the shoulder lug grooves 61, 63.

Figure 4:
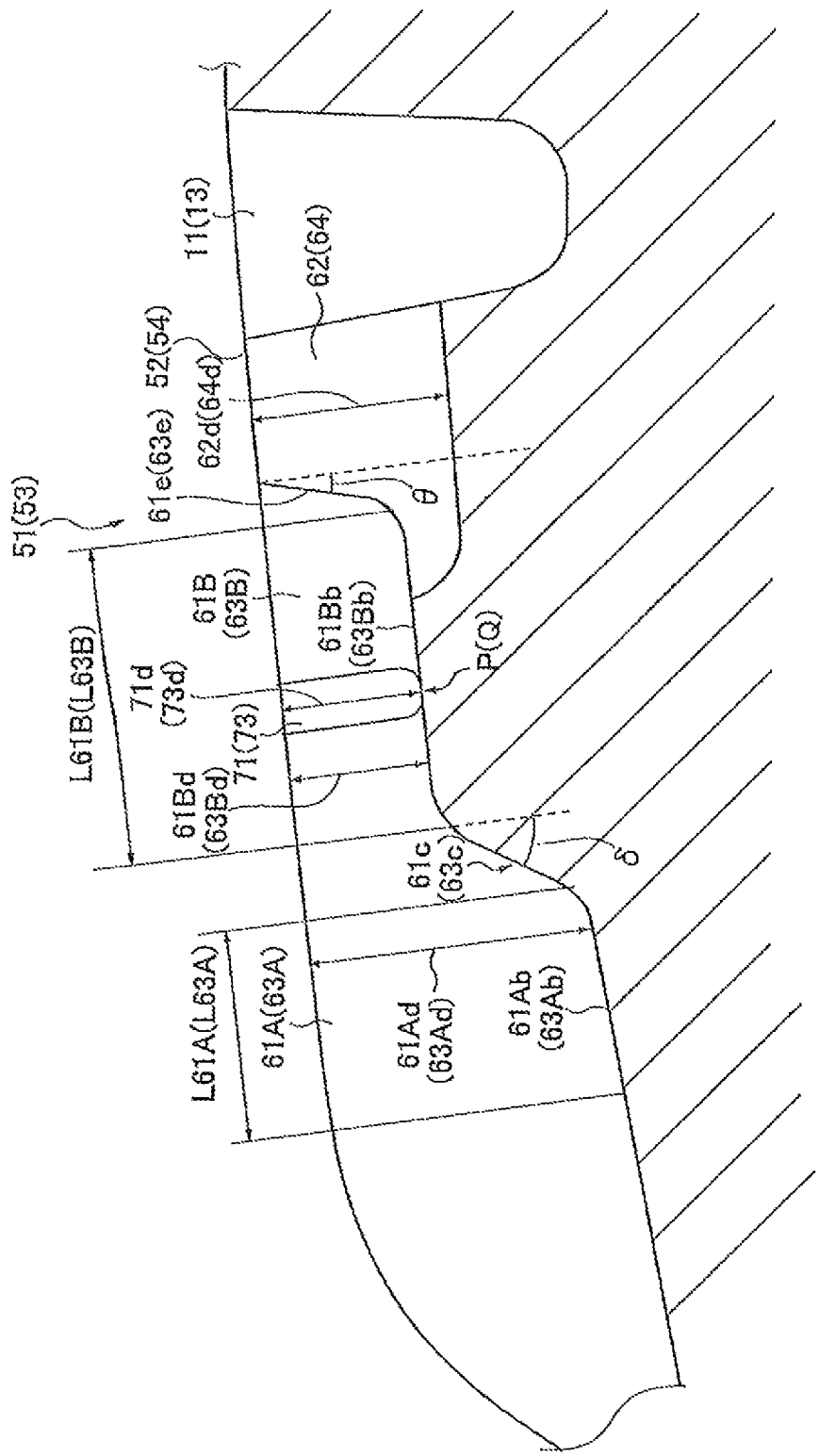
FIG. 4 is a cross-sectional view of the tread surface of the tire according to the present embodiment along line VIII-VIII (or IX-IX) in FIG. 3.
Figure 5:
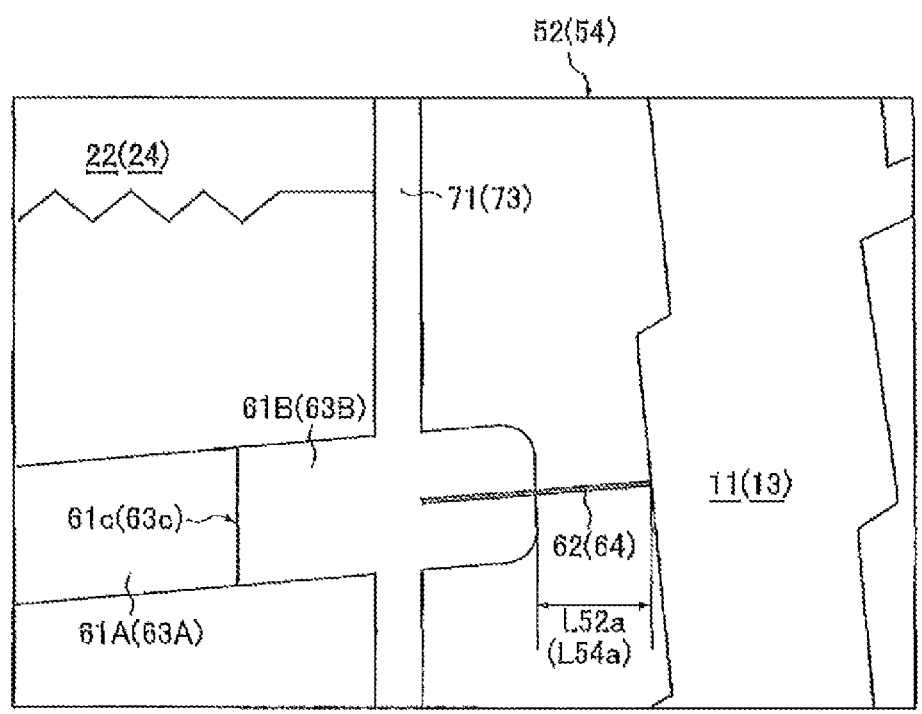
FIG. 5 is a magnified view of region A (or region B) illustrated in FIG. 3.
Figure 6:
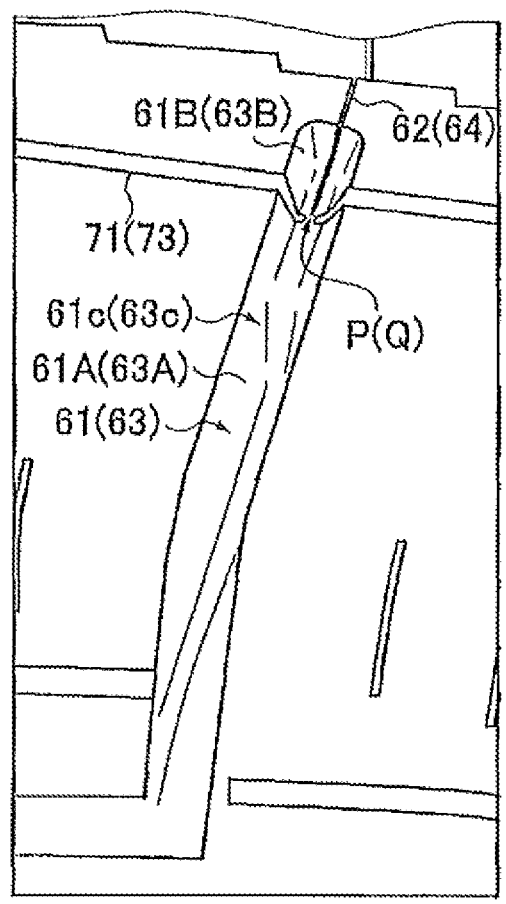
FIG. 6 is an external view of the tire illustrated in FIG. 1 from the outside with respect to the tire width direction, focusing on a region of a shoulder land portion.

As illustrated in FIGS. 4 to 6, the shoulder lug grooves 61, 63 include outer regions 61A, 63A (first regions), and inner regions 61B, 63B (second regions) that are disposed in the regions closer to the outer circumferential main grooves 11, 13 than the outer regions 61A, 63A and have a shallower groove depth than the outer regions 61A, 63A. FIG. 4 is a cross-sectional view of the tread surface of the tire along line VIII-VIII (or line XI-XI) in FIG. 3. FIG. 5 is a magnified view of region A (or region B) illustrated in FIG. 3. FIG. 6 is an external view of the tire 1 from the outside with respect to the tire width direction, focusing on a region of a shoulder land portions 51, 53. The reference numbers in parentheses in FIGS. 4 to 6 are for elements related to the region of the shoulder land portion 53. When referring to the numbers in parentheses in FIGS. 4 to 6, the orientation of the two sides of the tire circumferential direction is the reverse of that for the numbers outside the parentheses. This also applies to FIG. 9, which will be referred to hereafter. The groove depths 61Bd, 63Bd of the inner regions 61B, 63B are less than the groove depths 61Ad, 63Rd of the outer regions 61A, 63A, allowing the difference in rigidity between the continuous land portions 52, 54 and the outer regions 61A, 63A to be mitigated, improving steering performance when turning, and allowing uneven wearing to be suppressed.

The lengths of the inner regions 61B, 63B in the tire width direction are preferably from 30 to 70% of the lengths of the shoulder lug grooves 61, 63 in the tire width direction for the sake of striking a balance between wet steering stability, steering stability on snow, and wear resistance, respectively. The groove depths 61Ad, 63Rd of the outer regions 61A, 63A are preferably from 50 to 80% of the groove depths of the outer circumferential main grooves 11, 13 for the sake of striking a balance between wet steering stability and steering stability on snow, and wear resistance, respectively. The groove depths 61Bd, 63Bd of the inner regions 61B, 63B are preferably less than the groove depths of the outer circumferential main grooves 11, 13, preferably from 20 to 60% of the groove depths of the outer circumferential main grooves 11, 13, for the sake of striking a balance between wet steering stability, steering stability on snow, and wear resistance, respectively.

With respect to the ground contact width of the regions of the shoulder land portions 51, 53, the lengths L52a, L54a in the tire width direction of the continuous land portions 52, 54 between closed ends 61e, 63e of the shoulder lug grooves 61, 63 and edges 12, 14 of the outer circumferential main grooves 11, 13 are preferably from 10 to 25%, the lengths L61B, L63B in the tire width direction of the inner regions 61B, 63B are preferably from 35 to 65%, and the lengths L61A, L63A in the tire width direction of the outer regions 61A, 63A are preferably from 20 to 45%. Such relationships improve the balance between wear resistance, and wet steering stability and steering stability on snow. For example, the lengths L52a, L54a in the tire width direction of the continuous land portions 52, 54 are 18% of the ground contact width of the regions of the shoulder land portions 51, 53, the lengths L61B, L63B in the tire width direction of the inner regions 61B, 63B are 48%, and the lengths L61A, L63A in the tire width direction of the outer regions 61A, 63A is 34%.

The shoulder lug grooves 61, 63 preferably include closed wall portions 61e, 63e that extend so as to connect groove floors 61Bb, 63Bb of the inner regions 61B, 63B and the tread surface, and stepped portions 61c, 63c that connect groove floors 61Ab, 63Ab of the outer regions 61A, 63A and the groove floors 61Bb, 63Bb of the inner regions 61B, 63B, the closed wall portions 61e, 63e and the stepped portions 61c, 63c each being inclined from 10 to 60° outward in the tire width direction with respect to a direction opposite the direction of the normal line of the tread surface. "Direction opposite the direction of the normal line" refers to the direction from the outside of the tire toward the inside along a line perpendicular to the tread surface. The closed wall portions 61e, 63e comprise inclined wall surfaces that are inclined outward in the tire width direction (or outward in the direction in which the shoulder lug grooves 61, 63 extend on the tread surface) at an angle θ with respect to the direction opposite the direction of the normal line. The stepped portions 61c, 63c comprise inclined wall surfaces that are inclined outward in the tire width direction (or outward in the direction in which the shoulder lug grooves 61, 63 extend on the tread surface) at an angle of inclination δ with respect to the direction opposite the direction of the normal line. The angle of inclination θ of the closed wall portions 61e, 63e is the angle of inclination of with respect to an imaginary line extending in a direction opposite the direction of the normal line of the tread surface at the intersections between the tread surface and imaginary wall surfaces yielded by extending the inclined wall surfaces of the closed wall portions 61e, 63e. The angle of inclination δ of the stepped portions 61c, 63c is the angle of inclination with respect to an imaginary line extending in the direction opposite the direction of the normal line of the tread surface that passes through the intersections of the inclined wall surfaces of the stepped portions 61c, 63c and imaginary lines (lines indicating the maximum depths of the groove floors) extending the groove floors 61Bd, 63Bd in the direction of extension (in FIG. 4, the direction indicated by the double-headed arrow indicating the lengths L61B, L63B). The shape of the groove floors of the inner regions 61B, 63B may be parallel with the tread surface or extend in a straight line; in either case, the angle of inclination δ is determined using imaginary lines extending from the groove floors. The closed wall portions 61e, 63e do not encompass aspects in which the groove floors of the inner regions 61B, 63B grow progressively shallower toward the outer circumferential main grooves 11, 13 until reaching the continuous land portions 52, 54. In other words, the closed wall portions 61e, 63e are positioned in a different region of the tire width direction from the groove floors of the inner regions 61B, 63B. The stepped portions 61c, 63c do not encompass aspects in which the groove floors of the outer regions 61A, 63A grow progressively shallower toward the outer circumferential main grooves 11, 13 until reaching the inner regions 61B, 63B, or in which the groove floors of the inner regions 61B, 63B grow progressively deeper toward the tire width direction until reaching the outer regions 61A, 63A. In other words, the stepped portions 61c, 63c are positioned in a different region of the tire width direction from the groove floors of the inner regions 61B, 63B.

Both the angle of inclination θ and the angle of inclination δ being equal to or more than 10° allows differences in block rigidity between the continuous land portions 52, 54, the inner regions 61B, 63B, and the outer regions 61A, 63A to be mitigated, improving wear resistance, and wet steering stability and steering stability on snow. Because a great load is placed upon the tire 1 in the vicinity of the ground-contacting ends, it is desirable to ensure the groove volume of the shoulder lug grooves 61, 63 for the sake of improving steering stability on snow; having both the angle of inclination θ and the angle of inclination δ be no more than 60° ensures sufficient groove volume for the shoulder lug grooves 61, 63.

The groove widths 61w, 63w of the shoulder lug grooves 61, 63 are preferably greater than the widest groove widths 31w of outer regions 31B of lug grooves 31, to be described hereafter, and the widest groove widths 33w, 35w of outer regions 33B, 35B of lug grooves 33, 35, also to be described hereafter. These shoulder lug grooves 61, 63 ensure groove volume while ensuring the block rigidity of the shoulder land portions 51, 53, thereby allowing for a balance between wear resistance, and wet steering stability and steering stability on snow.

The shoulder lug grooves 61, 63 preferably extend from the outer end in the tire width direction to a length of equal to or more than 60%, more preferably from 70 to 80%, of the length of the ground-contacting regions of the shoulder land portions 51, 53. This ensures the block rigidity of the shoulder land portions 51, 53.

The shoulder lug grooves 61, 63 preferably extend in an inclined manner with respect to the tire circumferential direction. For example, the grooves have angles of from 75 to 90° with respect to the tire circumferential direction. Imparting the lug grooves 31, 33, 35 and shoulder lug grooves 61, 63 with different respective inclined angles yields a variety of inclined angles on the tread surface, thereby yielding superior wet steering stability and steering stability on snow when steering at small and medium steering angles while the vehicle is traveling.

The groove widths 61w, 63w of the shoulder lug grooves 61, 63 is preferably greater than the lengths of the openings of arc-shaped grooves 81, 83 in the tire circumferential direction.

The lengths of the continuous land portions 52, 54 in the tire width direction (i.e., the length in the tire width direction between the narrow circumferential grooves 71, 73 and the outer circumferential main grooves 11, 13) is preferably from 5 to 35% of the length of the ground-contacting regions of the shoulder land portions 51, 53 in the tire width direction. The ground-contacting regions of the shoulder land portions 51, 53 is the length of the ground contact width 11w of the tire in the tire width direction between the outer end in the tire width direction and the adjacent outer circumferential main groove 11, 13. The positions of the outer circumferential main grooves 11, 13 in the tire width direction is the center point of the lengths of the main groove walls 12, 14 in the tire width direction.

(Shoulder Sipes)

As illustrated in FIGS. 4 to 6, shoulder sipes 62, 64 that connect with the inner regions 61B, 63B and extend toward the outer circumferential main grooves 11, 13 and narrow circumferential grooves 71, 73 that extend in the tire circumferential direction and have groove widths that are less than the groove widths 61w, 63w of the shoulder lug grooves 61, 63 are further formed in the regions of the shoulder land portions 51, 53. Providing shoulder sipes 62, 64 allows for the mitigation of block rigidity in the tire width direction, while ensuring block rigidity under force acting in the tire circumferential direction, unlike the lug grooves. The shoulder sipes 62, 64 are capable of taking snow into the grooves to improve snow shear force, thereby allowing for increased steering stability on snow.

The ends of the shoulder sipes 62, 64 toward the outer circumferential main grooves 11, 13 may connected with the outer circumferential main grooves 11, 13, respectively, as illustrated in FIGS. 3 and 4 to 10, or may be closed off within the continuous land portions 52, 54 without connecting with the outer circumferential main grooves 11, 13. The outer ends of the shoulder sipes 62, 64 with respect to the tire width direction are preferably provided within the inner regions 61B, 63B along lengths equivalent to from 20 to 100% of the groove lengths L61B, L63B of the inner regions 61B, 63B, respectively. In this context, the "outer ends of the shoulder sipes 62, 64 with respect to the tire width direction" are those parts thereof formed within the inner regions 61B, 63B.

The shoulder sipes 62, 64 each may have a wavy shape on the tread surface extending with shifts in directions orthogonal to the direction of extension, as illustrated in FIGS. 3 and 5, or may be straight lines. In other words, the shape of the shoulder sipes 62, 64 on the tread surface may be a wavy pattern extending with shifts in directions intersecting the direction in which the shoulder sipes 62, 64 extend on the tread surface, or may be a straight line. In the present description, the "direction of extension" refers to the direction in which the grooves or the like extend along the tread surface unless noted otherwise. The shoulder sipes 62, 64 each may be formed in a wavy pattern by extending with shifts along the groove depth direction, or in straight lines with respect to the groove depth direction; a wavy pattern extending with shifts along the groove depth direction is preferable in order to ensure block rigidity during braking and driving.

Groove depths 62d, 64d of the shoulder sipes 62, 64 are preferably less than the groove depths 61Ad, 63Rd of the outer regions 61A, 63A of the shoulder lug grooves 61, 63 and greater than the groove depths 61Bd, 63Bd of the inner regions 61B, 63B, as illustrated in FIG. 4. Making the shoulder sipes more shallow than the outer regions 61A, 63A ensures block rigidity, and making the sipes deeper than the inner regions 61B, 63B sufficiently mitigates the block rigidity of the continuous land portions 52, 54 in the tire width direction and allows for ensured wet steering stability and steering stability on snow.

The groove depths 62d, 64d of the shoulder sipes 62, 64 may be constant along the direction of extension, as illustrated in FIG. 4, or may grow progressively shallower or deeper from the region closer to the outer circumferential main grooves 11, 13 toward the shoulder lug grooves 61, 63. If the groove depths 62d, 64d grow progressively shallower or deeper toward the shoulder lug grooves 61, 63, the groove floors of the shoulder sipes 62, 64 are preferably formed so as to extend in straight lines in the direction of extension.

The outer ends of the shoulder sipes 62, 64 in the tire width direction are preferably formed so as to penetrate into the inner regions 61B, 63B of the shoulder lug grooves, as illustrated in FIGS. 4 to 6. Specifically, the outer ends of the shoulder sipes 62, 64 in the tire width direction are formed by extending into at least a part of the regions of the inner regions 61B, 63B of the shoulder lug grooves 61, 63. This sufficiently mitigates the block rigidity of the continuous land portions 52, 54 in the tire width direction and allows for ensured wet steering stability and steering stability on snow. In this case, the sipe depths of the shoulder sipes 62, 64 are greater than the groove depths of the inner regions 61B, 63B. The ends of the shoulder sipes 62, 64 may extend into at least a part of the regions of the inner regions 61B, 63B, or may extend into the entirety thereof.

(Circumferential Narrow Groove)

The narrow circumferential grooves 71, 73 are formed in the regions of the shoulder land portions 51, 53, as discussed above. Providing the narrow circumferential grooves 71, 73 improves wet steering stability and steering stability on snow, and sufficiently ensures the block rigidity of the shoulder land portions 51, 53 due to the groove widths 71w, 73w of the narrow circumferential grooves 71, 73 being less than the groove widths 61w, 63w of the shoulder lug grooves 61, 63.

The narrow circumferential grooves 71, 73 intersect with the inner regions 61B, 63B of the shoulder lug grooves 61, 63. Disposing the narrow circumferential grooves 71, 73 in the regions of the inner regions 61B, 63B, the block rigidity of which has been ensured, in this way minimizes reductions in block rigidity. If the narrow circumferential grooves 71, 73 were disposed in the continuous land portions 52, 54, dramatic improvement in wet steering stability and steering stability on snow would not be expected due to the proximity to the outer circumferential main grooves 11, 13, and if they were disposed in the outer regions 61A, 63A, block rigidity would decrease, and wear resistance could not be ensured.

The groove widths 71w, 73w of the narrow circumferential grooves 71, 73 are preferably from 3 to 15% of the ground contact width of the shoulder land portions 51, 53 in order to minimize reductions in block rigidity. In order to strike a balance between wet steering stability and steering stability on snow, and wear resistance, the groove depths 71d, 73d of the narrow circumferential grooves 71, 73 are preferably equal to or less than the groove depths 61Ad, 63Ad of the outer regions 61A, 63A, and equal to or less than the groove depths 61Bd, 63Bd of the inner regions 61B, 63B. In these cases, the groove depths 71d, 73d of the narrow circumferential grooves 71, 73 are more preferably equal to or more than 2 mm.

The groove depths 71d, 73d of the narrow circumferential grooves 71, 73 may be less than, greater than, or equal to the groove depths 61Ad, 63Ad of the inner regions 61A, 63A, and are, for example, equal to the groove depths 61Ad, 63Ad. The groove depths 71d, 73d of the narrow circumferential grooves 71, 73 may be less than, greater than, or equal to the groove depths of the shoulder sipes 62, 64, and are, for example, less than the groove depths of the shoulder sipes 62, 64.

The groove depths 71d, 73d of the narrow circumferential grooves 71, 73 are less than the groove depths 61Ad, 63Ad of the outer regions 61A, 63A of the shoulder lug grooves 61, 63. This allow reductions in the block rigidity of the shoulder land portions 51, 53 to be minimized.

(Lug Grooves 31)

The tread pattern 10 preferably further comprises a plurality of lug grooves 31 that traverse the region of the center land portion 21 and form a plurality of the region of land portion blocks 22 in the region of the center land portion 21.

Figure 8:
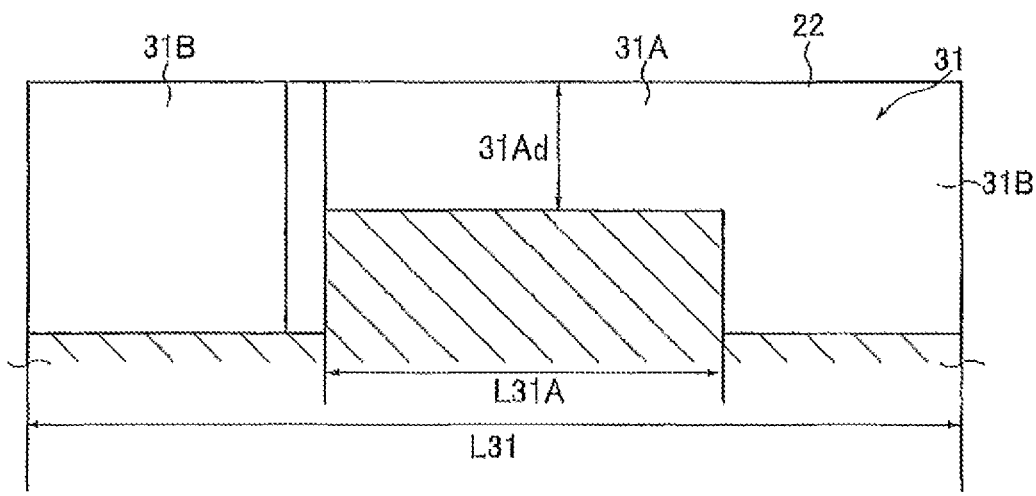
FIG. 8 is a cross-sectional view of the tread surface of the tire illustrated in FIG. 1 along line V-V in FIG. 3.

As illustrated in FIG. 7, each of the lug grooves 31 includes a central region 31A (first lug groove region) being a central region of the direction of extension of the lug groove 31 along the tire width direction, and two outer regions 31B (second lug groove regions) that are regions on both sides of the central region 31A in the tire width direction and connected with the central region 31A. The central region 31A is formed by extending a predetermined distance in the direction of extension of the lug groove 31. The central region 31A has a groove width 31Aw that is less than those of the outer regions 31B, as illustrated in FIG. 7, and a groove depth 31Ad that is less than those of the outer regions 31B, as illustrated in FIG. 8. FIG. 8 is a cross-sectional view of the tread surface of the tire 1 along line V-V in FIG. 3.

The provision of a region 31A configured in this way along part of the region in the direction of extension of the lug grooves 31 ensures the rigidity of the center land portion 21, minimizing reductions in wear resistance on dry road surfaces, and ensures groove volume in the lug grooves 31 necessary to improve water discharge ability and snow shear force, allowing for improved wet steering stability and steering stability on snow. In other words, it is possible to achieve a balance between wear resistance, and wet steering stability and steering stability on snow. In particular, because the central region 31A is formed along a predetermined length of the region in the direction of extension of the lug grooves 31, block rigidity can be considerably improved over that of a conventional tire in which protrusions whose grooves are shallower (raised) than elsewhere in the region in the direction of extension are locally formed along the length of the lug groove. Because the central regions 31A are formed in those regions in the regions in the direction of extension of the lug grooves 31 that traverse the tire centerline CL, and the outer regions 31B are formed in the regions on both side of the central region 31A interposed therebetween, a high balance is achieved between wear resistance, and wet steering stability and steering stability on snow.

The groove length L31A of the central regions 31A of the lug grooves 31 is preferably from 30 to 80% of the groove length L31 of the lug grooves 31, more preferably from 40 to 70%. Imparting the lug grooves 31A with a length L31A that is equal to or less than the maximum value of the range described above ensures sufficient groove volume in the lug grooves 31, and imparting the grooves with a length that is equal to or greater than the minimum value of the range described above ensures sufficient block rigidity in the center land portion 21. The groove length L31A of the central regions 31A of the lug grooves 31 is, for example, 55% of the groove length L31 of the lug grooves 31.

As illustrated in FIG. 3, the lug grooves 31 are preferably inclined with respect to the tire circumferential direction and extend in a direction connecting the upper left side and lower right side of FIG. 3. The angle thereof with respect to the tire circumferential direction is, for example from 60 to 85° in the counterclockwise direction. Having the lug grooves 31 be highly inclined with respect to the tire circumferential direction ensures the block rigidity of the center land portion 21, and improves wet steering stability and steering stability on snow at low steering angles during driving.

The lug grooves 31 may each extend in straight lines or in gentle curves.

(Lug Grooves 33, 35)

The tread pattern 10 preferably further comprises a plurality of lug grooves 33 that traverse the intermediate the region of land portion 23 and form a plurality of land portion blocks 24 in the region of the intermediate land portion 23, and a plurality of lug grooves 35 that traverse the region of the intermediate land portion 25 and form a plurality of land portion blocks 26 in the region of the intermediate land portion 25. The intermediate land portion 23 is defined by the outer circumferential main groove 11 and the inner circumferential main groove 15. The intermediate land portion 25 is defined by the outer circumferential main groove 13 and the inner circumferential main groove 17.

Figure 9:
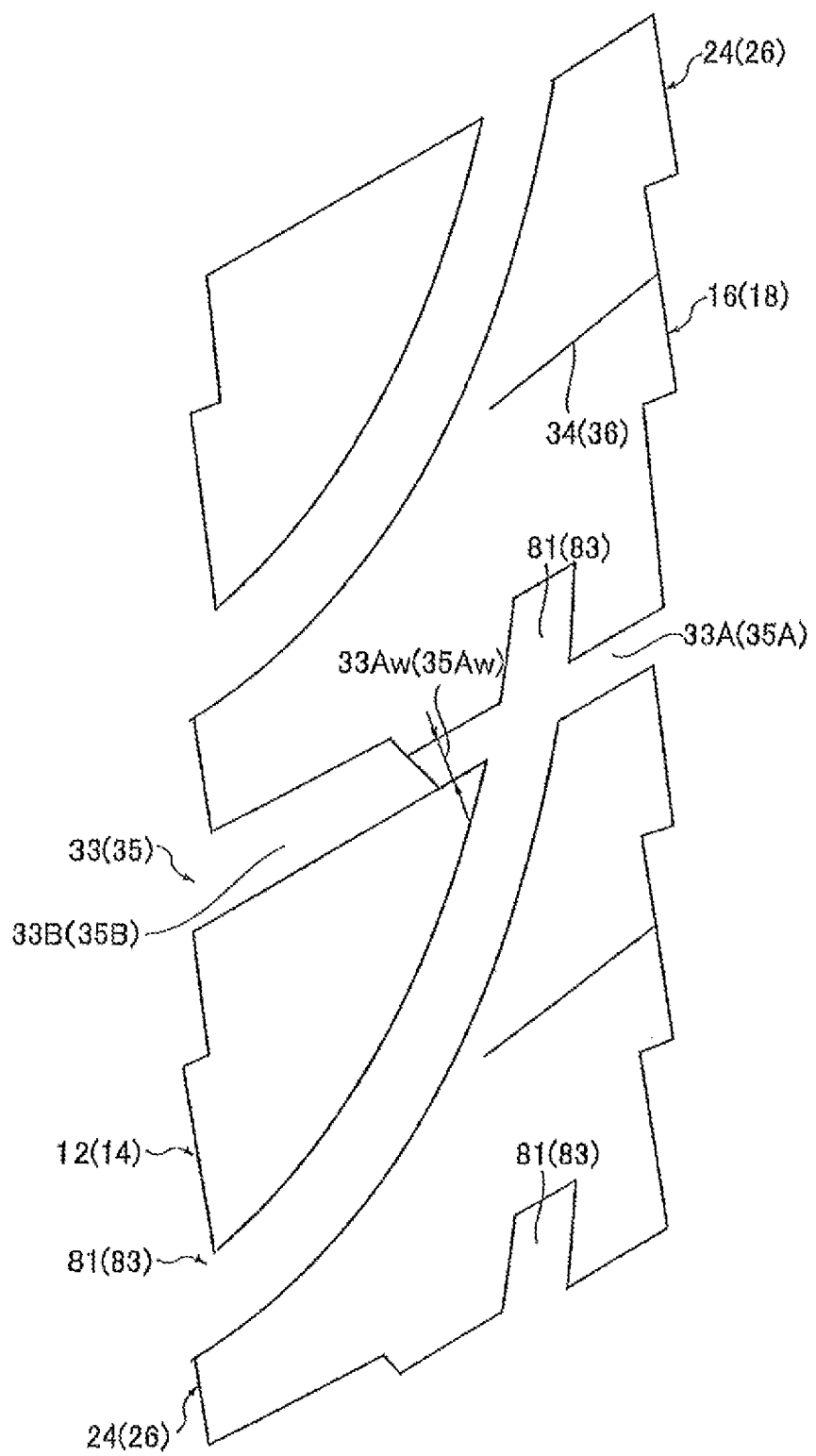
FIG. 9 is a magnified view of the tread pattern illustrated in FIG. 3 focusing on land portion blocks in an intermediate land portion.
Figure 10:
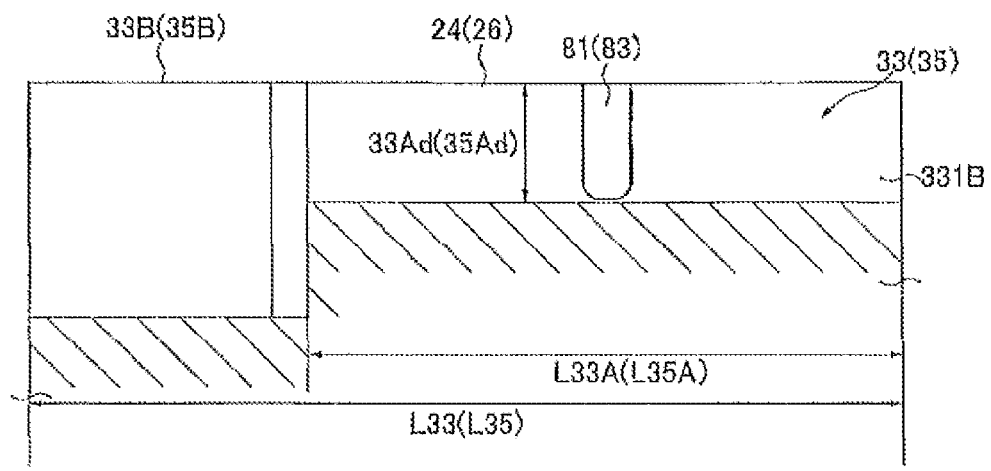
FIG. 10 is a cross-sectional view of the tread surface of the tire illustrated in FIG. 1 along line VII-VII (or VI-VI) in FIG. 3.

As illustrated in FIG. 9, the lug grooves 33, 35 include inner regions 33A, 35A (first lug groove regions) being regions in the direction of extension in the regions closer to the inner circumferential main grooves 15, 17, and outer regions 33B, 35B (second lug groove regions) being other regions in the direction of extension in the regions closer to the outer circumferential main grooves 11, 13 that connect with the inner regions 33A, 35A, respectively. FIG. 9 is a magnified view of the tread pattern 10 focusing on land portion blocks 24, 26 of the intermediate land portions 23, 25. The reference numbers in parentheses in FIG. 9 are for elements related to the region of the intermediate land portion 25. The inner regions 33A, 35A are formed by extending by a predetermined distance in the direction of extension of the lug grooves 33, 35. As illustrated in FIG. 9, the inner regions 33A, 35A have groove widths 33Aw, 35Aw that are narrower than those of the outer regions 33B, 35B, and, as illustrated in FIG. 10, have groove depths 33Ad, 35Ad that are shallower than those of the outer regions 33B, 35B. FIG. 10 is a cross-sectional view of the tread surface of the tire 1 along line VII-VII (or VI-VI) in FIG. 3. The reference numbers in parentheses in FIG. 10 are for elements related to the region of the intermediate land portion 25.

The provision of the inner regions 33A, 35A to the inside of the lug grooves 33, 35 in this way ensures the rigidity of the intermediate land portions 23, 25, minimizing reductions in wear resistance on dry road surfaces, and ensures groove volume within the lug grooves 33, 35 necessary to improve water discharge ability and snow shear force, allowing for improved wet steering stability and steering stability on snow. In other words, it is possible to achieve a balance between wear resistance, and wet steering stability and steering stability on snow. In particular, block rigidity can be considerably improved over cases in which projections formed by locally raising the floors of the lug grooves over other regions in the direction of extension are formed in the inner regions 33A, 35A. The inner regions 33A, 35A are formed in regions along the direction of extension of the lug grooves 33, 35 in the regions closer to the inner circumferential main grooves 15, 17, and the outer regions 33B, 35B are formed in other regions in the direction of extension in the regions closer to the outer circumferential main grooves 11, 13, thereby allowing for a high balance between wear resistance and wet steering stability and steering stability on snow.

Also, the inner regions 33A, 35A are formed so as to connect with the inner circumferential main grooves 15, 17, and the outer regions 33B, 35B are connected with the inner regions 33A, 35A and the outer circumferential main grooves 11, 13, respectively. This allows the rigidity of the region of the tread portion 2 near the centerline CL to be increased and wear resistance to be improved while ensuring wet steering stability and steering stability on snow.

The lengths L33A, L35A of the inner regions 33A, 35A of the lug grooves 33, 35 is preferably from 30 to 80%, more preferably from 40 to 70%, of the groove lengths L33, L35 of the lug grooves 33, 35. Setting the lengths L33A, L33A of the lug grooves 33, 35 at or below the maximum value of the range described above ensures sufficient groove volume in the lug grooves 33, 35, and setting the lengths at or above the minimum value of the range described above ensures sufficient block rigidity in the intermediate land portions 23, 25. The groove lengths L31A, L33A of the inner regions 33A, 35A are, for example, 55% of the groove lengths L33, L33 of the lug grooves 33, 35.

The proportion of the groove lengths L33A, L35A of the inner regions 33A, 35A to the groove lengths L33, L35 of the lug grooves 33, 35 may be equal to or different from the proportion of the groove length L31A of the central region 31A to the groove length L31 of the lug grooves 31. Both of the groove lengths L33A, L35A of the lug grooves 33, 35 may occupy equal or different proportions to the groove lengths L33, L35 of the lug grooves 33, 35.

Arc-shaped Grooves 81, 83 are preferably formed in the land portion blocks 24, 26 of the intermediate land portions 23, 25. The arc-shaped grooves 81, 83 extend in arc-shaped curves from the outer circumferential main grooves 11, 13 defining ends of the land portion blocks 24, 26 in the tire width direction to the lug grooves 33, 35 defining ends of the land portion blocks 24, 26 in the tire circumferential direction, and are further formed so as to traverse the lug grooves 33, 35 and be closed off within other land portion blocks 24, 26 that are adjacent in the tire circumferential direction. As a result, the arc-shaped grooves 81, 83 comprise openings that connect with the outer circumferential main grooves 11, 13, and closed ends that are closed off within other land portion blocks 24, 26 that are adjacent in the tire circumferential direction. Suitably disposing arc-shaped grooves 81, 83 as described above along with the lug grooves 33, 35 adjacent to the arc-shaped grooves 81, 83, the outer circumferential main grooves 11, 13, and the inner circumferential main grooves 15, 17 better ensures wet steering stability and steering stability on snow. There is no particular limitation upon the groove depths of the arc-shaped grooves 81, 83; for example, the depths may be identical to the groove depths of the lug grooves 33, 35 at positions intersecting the lug grooves 33, 35.

As illustrated in FIG. 3, the lug grooves 33, 35 preferably extend in an inclined manner with respect to the tire circumferential direction in a direction connecting the lower left side and the upper right side of FIG. 3. The angle thereof with respect to the tire circumferential direction is, for example from 60 to 85° in the clockwise direction. Having the lug grooves 31 be highly inclined with respect to the tire circumferential direction ensures the block rigidity of the intermediate land portions 23, 25, and improves wet steering stability and steering stability on snow at low steering angles during driving. In addition, having the lug grooves 33, 35 be tilted in the oppose direction with respect to the tire circumferential direction as the lug grooves 31 ensures steering performance when turning left or right.

In the present embodiment, the elements in the region of the intermediate land portion 23 and the elements in the region of the intermediate land portion 25 are formed so as to be symmetrical with respect to a point on the tire centerline CL; however, they need not be symmetrically formed in other embodiments. The lug grooves 33, 35 may each extend in straight lines or in gentle curves.

(Sipes)

The tread pattern 10 preferably further comprises sipes 30, 32, 34, 36 in the land portion blocks 22, 24, 26 that extend in parallel with the lug grooves 31, 33, 35, respectively. In the present description, the term "sipe" (except in the case of the shoulder sipes 62, 64) refers to a groove having widths of less than 1.5 mm and groove depths of less than 7 mm. Furthermore, the lug grooves have a groove width of 1.5 mm or more and have a groove depth of 7 mm or more. Sipes 30, 32, 34, 36 configured in this way are useful in ensuring, in conjunction with the outer circumferential main grooves 11, 13, inner circumferential main grooves 15, 17, lug grooves 31, 33, 35, and shoulder lug grooves 61, 63 (to be described hereafter), the basic wet steering stability and steering stability on snow required of an all-season tire.

As illustrated in FIG. 7, the sipes 32, 30 in the region of the center land portion 22 preferably extend across the tire centerline CL so as to connect both of the bend points 16a, 18a. This allows stress concentrated near the bend points 16a, 18a to escape through the deformation of the sipes 32, 30, improving wear resistance.

It is preferable that two sipes 32 and 20 be formed in a single land portion block, the two sipes 32, 30 being formed so as to face each other with respect to a center 22a of the land portion block 22 on the tread surface and extend in a wavy pattern formed with shifts in directions orthogonal to the direction of extension of each sipe extend. In the present embodiment, for the two sipes 32, 30 to face each other with respect to a center 22a of the land portion block 22 on the tread surface means that the shapes of the sipes 32, 30 on the tread surface exhibit point symmetry with respect to the center 22a; however, the shapes of the two sipes 32, 30 on the tread surface may also exhibit, for example, linear symmetry with respect to a line extending through the center 22a in a direction parallel to the direction of extension of the lug groove 31. Providing the sipes 32, 30 in this way causes the land portion block 22 to have uniform block rigidity along the tire circumferential direction, and improves uneven wear resistance when braking and driving. The wavy shapes of the sipes 32, 30 suppresses the formation of non-uniform ground contact pressure distributions when force is applied from a direction other than the direction in which the sipes 32, 30 extend and the land portion blocks 22 tend to collapse and deform, thereby minimizing reductions in ground contact area. The sipes 32, 30 may be formed so as to extend in a wavy pattern formed with shifts in the groove depth direction, or so as to extend in a straight line in the groove depth direction.

One sipe 34, 36 is formed in the land portions 23, 25 for each land portion block 24, 26. One end of the sipes 34, 36 is connected to the inner circumferential main grooves 15, 17, and the other end is closed off within the land portion blocks 24, 25 without being connected to the arc-shaped grooves 81, 83.

Examples of the dimensions of the elements for the tire 1 described above will be provided below.

The groove depth of the outer regions 61A, 63A of the shoulder lug grooves 61, 63 is from 8 to 12 mm. The groove depth of the inner regions 61B, 63B is from 2 to 8 mm. The groove depth of the shoulder lug grooves 61, 63 is from 8 to 12 mm. The groove width of the narrow circumferential grooves 71, 73 is from 1.5 to 5 mm.

The ground contact width of the tire is from 130 to 230 mm, and the ground contact width of the ground contact width of the regions of the shoulder land portions 51, 53 in the ground contact width is from 25 to 45 mm. The lengths L52a, L54a of the continuous land portions 52, 54 in the tire width direction is from 3 to 10 mm. The length of the inner regions 61B, 63B in the tire width direction is from 5 to 25 mm.

The angle of inclination θ of the closed wall portions 61e, 63e and the angle of inclination δ of the stepped portions 61c, 63c are from 10 to 60° each.

The groove depth of the shoulder sipes 62, 64 is from 2 to 12 mm.

To summarize the effects of the pneumatic tire 1 according to the present embodiment described above, inner regions 61B, 63B having a shallower groove depth than the outer regions 61A, 63A are formed in the shoulder lug grooves 61, 63, shoulder sipes 62, 64 and narrow circumferential grooves 71, 73 are formed in the shoulder land portions 51, 53, and the narrow circumferential grooves 71, 73 intersect with the inner regions 61B, 63B. Narrow circumferential grooves 71, 73 are disposed in the regions of the inner regions 61B, 63B, the block rigidity of which has been ensured as described above, thereby minimizing reductions in block rigidity and allowing for a balance between wear resistant, and wet steering stability and steering stability on snow.

With respect to the ground contact width of the regions of the shoulder land portions 51, 53, the lengths L52a, L54a of the continuous land portions 52, 54 in the tire width direction is from 10 to 25%, the lengths of the inner regions 61B, 63B of the shoulder lug grooves 61, 63 in the tire width direction is from 35 to 65%, and the length of the outer regions 61A, 63A in the tire width direction is from 20 to 45%, thereby improving the balance between wear resistance, and wet steering stability and steering stability on snow.

The angle of inclination θ of the closed wall portions 61e, 63 of the shoulder lug grooves 61, 63 and the angle of inclination δ of the stepped portions 61c, 63c are each inclined from 10 to 60° outward in the tire width direction with respect to the direction opposite the direction of the normal line of the tread surface. Both the angle of inclination θ and the angle of inclination δ being equal to or more than 10° allows differences in block rigidity between the continuous land portions 52, 54, the inner regions 61B, 63B, and the outer regions 61A, 63A to be mitigated, improving wear resistance, and wet steering stability and steering stability on snow. Because a great load is placed upon the tire 1 in the vicinity of the ground-contacting ends, it is desirable to ensure the groove volume of the shoulder lug grooves 61, 63 for the sake of improving steering stability on snow; having both the angle of inclination θ and the angle of inclination δ be no more than 60° ensures sufficient groove volume for the shoulder lug grooves 61, 63.

The groove depth of the shoulder sipes 62, 64 grows progressively shallower from the regions closer to outer circumferential main grooves 11, 13 toward the shoulder lug grooves 61, 63, thereby further mitigating the block rigidity of the continuous land portions 52, 54 in the tire width direction, and allowing wet steering stability and steering stability on snow to be ensured.

The groove depth of the shoulder sipes 62, 64 is less than the groove depth of the outer regions of the shoulder lug grooves and greater than the groove depth of the inner region, thereby ensuring block rigidity in the shoulder land portions 51, 53, and sufficiently mitigating the block rigidity of the continuous land portions 52, 54 in the tire width direction, thereby allowing for ensured wet steering stability and steering stability on snow.

The sipe depth of the shoulder sipes is greater than the groove depth of the inner regions 61B, 63B, and the outer ends of the shoulder sipes 62, 64 in the tire width direction are formed by extending into at least a part of the regions of the inner regions 61B, 63B of the shoulder lug grooves 61, 63, thereby ensuring sufficient block rigidity of the continuous land portions 52, 54 in the tire width direction, and allowing for ensured wet steering stability and steering stability on snow.

The groove depth of the outer regions 61B, 63B of the shoulder lug grooves 61, 63 is less than the groove depth of the outer circumferential main grooves 11, 13, thereby allowing for a balance between wear resistance, and steering stability on snow and wet steering stability.

The length of the inner regions 61B, 63B of the shoulder lug grooves 61, 63 in the tire width direction is from 30 to 70% of the length of the shoulder lug grooves 61, 63 in the tire width direction, thereby allowing for a balance between wear resistance, and steering stability on snow and wet steering stability.

The groove depth of the narrow circumferential grooves 71, 73 is equal to or less than the groove depth of the inner regions 61A, 63A of the shoulder lug grooves 61, 63, thereby allowing for a balance between wear resistance, and steering stability on snow and wet steering stability.

The formation of narrow first lug groove regions 31A, 33A, 35A having raised floors in either the lug grooves 31 in the region of the center land portion 21 or the lug grooves 33, 35 in the intermediate land portions 23, 25 of the tread pattern 10 minimizes reductions in the block rigidity of center land portions 21 and intermediate land portions 23, 25 that are adjacent in the tire circumferential direction, allowing for ensured wear resistance on dry road surfaces, and ensures the groove volume of the lug grooves 31, 33, 35, allowing for ensured wet steering stability and steering stability on snow. This allows for a balance between wear resistance, and wet steering stability and steering stability on snow.

The groove length of the central regions 31A of the lug grooves 31 in the region of the center land portion 21 is from 30 to 80% of the groove length of the lug grooves 31, thereby ensuring sufficient groove volume in the lug grooves 31 and sufficient block rigidity in the center land portion 21, in turn allowing for a balance between wear resistance, and steering stability on snow and wet steering stability.

The groove width of the shoulder lug grooves 61, 63 is greater than the widest groove width of the outer regions 31B of the lug grooves 31 in the region of the center land portion 21 and the widest groove width of the outer regions 33B, 35B of the lug grooves 33, 35 in the regions of the intermediate land portions 23, 25, allowing for ensured groove volume while ensuring the block rigidity of the shoulder land portions 51, 53, and allowing for a balance between wear resistance, and wet steering stability and steering stability.

(Other Embodiments)

The lengths of the continuous land portions, the inner regions, and the outer regions in the tire width direction with respect to the ground contact width of the regions of the shoulder land portions need not fall within the ranges described above. The angles of inclination of the closed wall portions of the shoulder lug grooves and the stepped portions with respect to the direction opposite the direction of the normal line of the tread surface may be less than 10° or greater than 60° outward in the tire width direction. The sipe depth of the shoulder sipes need not be less than the groove depth of the outer regions of the shoulder lug grooves and greater than the groove depth of the inner regions.

The groove floors of the inner regions of the shoulder lug grooves need not be raised to form a step difference with the groove floors of the outer regions. The outer ends of the shoulder sipes in the tire width direction need not be formed so as to penetrate into the inner regions of the shoulder lug grooves. The shoulder lug grooves may be connected to the outer circumferential main grooves, thereby forming a plurality of land portion blocks in the tire circumferential direction. The tread pattern may not have the shoulder land portions.

The lug grooves including the first lug groove regions and the second lug groove regions may be in at least one of the center land portion 21 and the intermediate land portion 23 and intermediate land portion 25.

The number of circumferential main grooves is not limited to four; there may be only three, or five or more.

EXAMPLES

Test tires were manufactured to study the effects of the tread pattern 10 of the tire 1 of the present technology.

The tire size was P265/70R17 113T. Using 17×7.5 J rims, tires provided with tread patterns having the specifications shown in Tables 1 to 9 below were manufactured. The groove width of each of the circumferential main grooves was 10 mm. The groove depth of the inner regions of the shoulder lug grooves was 4 mm, and the groove depth of the outer regions was 8 mm. Unless noted otherwise, the tires shown in Tables 1 to 9 were similar to that of Working Example 1 apart from having the specifications shown in the tables, and were similar to the tread pattern illustrated in FIG. 3 in terms of other specifications.

An FF vehicle with an engine displacement of 2 liters was used as a vehicle for studying tire performance. The inner pressure of all of the front wheels and the rear wheels was set to 210 kPa.

The performance of the tire was evaluated as follows for wet steering stability, steering stability on snow, and wear resistance. Evaluation results are shown in Tables 1 to 9.

In the tables, arrow marks "←" in fields indicate ditto marks for the field to which the arrow points. In the tables, "Land portion" refers to a shoulder land portion, "Through" indicates that the shoulder lug grooves connect with the outer circumferential main grooves, and "Rib" refers to a continuous land portion.

(Wet Steering Stability)

Average lateral acceleration was measured for 5 laps at a maximum speed on a 30 m-radius curved course of an outdoor tire testing facility having a wet road surface with a water depth of 1 mm. The evaluation was carried out by taking the inverse of the measurement values and expressing the inverse of the measurement values of the tire of the Conventional Example as 100. Larger index values indicate superior wet steering stability.

(Steering Stability on Snow)

Measurement was performed in a manner similar to the procedure used to measure wet steering stability as described above, except that a snow-covered road surface was driven on instead of a wet road surface having a water depth of 1 mm. The evaluation was carried out by taking the inverse of the measurement values and expressing the inverse of the measurement values of the tire of the Conventional Example as 100. A greater index value indicates superior steering stability on snow.

(Wear Resistance)

Wear after traveling 2,000 km on public roads on dry road surface was measured. The evaluation was carried out by taking the inverse of the measurement values and expressing the inverse of the measurement values of the tire of the Conventional Example as 100. A larger index signifies a correspondingly superior wear resistance.

There was deemed to be a superior balance between wear resistance, and steering stability on snow and wet steering stability if i) the evaluation indexes for steering stability on snow, wet steering stability, and wear resistant were all 98 or higher, and ii) the total value for the three evaluation indexes for steering stability on snow, wet steering stability, and wear resistance was 309 or higher. There was deemed not to be a significant difference between two evaluation indexes if the difference was 2 or less.

TABLE 1

|  | Conventional Example | Comparative Example 1 | Comparative Example 2 | Comparative Example 3 |
|---|---|---|---|---|
| Shoulder lug grooves present?/ Closed off within land portions? | Present/ Through | Absent | Present/ Through | Present/ Closed off |
| Shape of regions of shoulder land portions | Block | Rib | Block | Block + rib |
| Inner regions present? | Present | ← | ← | Absent |
| Shoulder sipes present? | Present | ← | ← | ← |
| Narrow circumferential grooves present? | Absent | Present | ← | ← |
| Position of intersection between narrow circumferential grooves and shoulder lug grooves | — | Shallow grooved regions | ← | ← |
| Steering stability on snow | 100 | 90 | 103 | 103 |
| Wet steering stability | 100 | 90 | 103 | 103 |
| Wear resistance | 100 | 110 | 100 | 100 |

|  | Comparative Example 4 | Comparative Example 5 | Comparative Example 6 | Working Example 1 |
|---|---|---|---|---|
| Shoulder lug grooves present?/ Closed off within land portions? | Present/ Closed off | ← | ← | ← |
| Shape of regions of shoulder land portions | Block + rib | ← | ← | ← |
| Inner regions present? | Present | ← | ← | ← |
| Shoulder sipes present? | Absent | Present | ← | ← |
| Narrow circumferential grooves present? | Present | Absent | Present | ← |
| Position of intersection between narrow circumferential grooves and shoulder lug grooves | Shallow grooved regions | — | Deep grooved regions | Shallow grooved regions |
| Steering stability on snow | 100 | 103 | 103 | 106 |
| Wet steering stability | 100 | 102 | 103 | 106 |
| Wear resistance | 103 | 103 | 97 | 103 |

As shown by Table 1, there was a superior balance between wear resistance, and steering stability on snow and wet steering stability when ribs (continuous land portions) and a plurality of land portion blocks were formed in the regions of the shoulder land portions by the shoulder lug grooves being closed off, inner regions with a shallow groove depth were formed in the shoulder lug grooves, shoulder sipes and narrow circumferential grooves were formed, and the narrow circumferential grooves and the shoulder lug grooves intersected in the inner regions (Working Example 1).

Meanwhile, steering stability on snow and wet steering stability decreased when there were no shoulder lug grooves in the regions of the shoulder land portions (Comparative Example 1). There was no improvement in wear resistance when the shoulder lug grooves connected with the outer circumferential main grooves and no continuous land portions were formed (Comparative Example 2), or when the shoulder lug grooves closed off within the regions of the shoulder land portions did not comprise inner regions having a shallow groove depth (Comparative Example 3). There was no improvement in wet steering stability or steering stability on snow when there were no shoulder sipes (Comparative Example 4). There was not a sufficient balance between wear resistance, and wet steering stability and steering stability when there were no narrow circumferential grooves (Comparative Example 5). Wear resistance was reduced when narrow circumferential grooves intersected with shoulder lug grooves in outer regions having deep groove floors (Comparative Example 6).

TABLE 2

|  | Working Example 2 | Working Example 3 | Working Example 1 | Working Example 4 | Working Example 5 |
|---|---|---|---|---|---|
| Rib width/shoulder ground contact width (%) | 5 | 10 | 20 | 25 | 30 |
| Inner region width/shoulder ground contact width (%) | 45 | ← | ← | ← | ← |
| Outer region width/shoulder ground contact width (%) | 35 | ← | ← | ← | ← |
| Shoulder sipe width/shoulder ground contact width (%) | 60 | ← | ← | ← | ← |
| Steering stability on snow | 110 | 108 | 106 | 106 | 103 |
| Wet steering stability | 110 | 108 | 106 | 106 | 103 |
| Wear resistance | 98 | 99 | 103 | 103 | 105 |

|  | Working Example 6 | Working Example 7 | Working Example 8 | Working Example 9 |
|---|---|---|---|---|
| Rib width/shoulder ground contact width (%) | 20 | ← | ← | ← |
| Inner region width/shoulder ground contact width (%) | 35 | 40 | 60 | 65 |
| Outer region width/shoulder ground contact width (%) | 35 | ← | ← | ← |
| Shoulder sipe width/shoulder ground contact width (%) | 60 | ← | ← | ← |
| Steering stability on snow | 107 | 106 | 105 | 104 |
| Wet steering stability | 107 | 106 | 105 | 104 |
| Wear resistance | 100 | 103 | 106 | 108 |

TABLE 3

|  | Working Example 10 | Working Example 11 | Working Example 1 |
|---|---|---|---|
| Rib width/shoulder ground contact width (%) | 20 | ← | ← |
| Inner region width/shoulder ground contact width (%) | 45 | ← | ← |
| Outer region width/shoulder ground contact width (%) | 15 | 20 | 35 |
| Shoulder sipe width/shoulder ground contact width (%) | 60 | ← | ← |
| Steering stability on snow | 104 | 105 | 106 |
| Wet steering stability | 104 | 105 | 106 |
| Wear resistance | 105 | 104 | 103 |

|  | Working Example 12 | Working Example 13 |
|---|---|---|
| Rib width/shoulder ground contact width (%) | 20 | ← |
| Inner region width/shoulder ground contact width (%) | 45 | ← |
| Outer region width/shoulder ground contact width (%) | 40 | 45 |
| Shoulder sipe width/shoulder ground contact width (%) | 60 | ← |
| Steering stability on snow | 107 | 108 |
| Wet steering stability | 107 | 108 |
| Wear resistance | 102 | 101 |

There was deemed to be a high balance between wear resistance, and steering stability on snow and wet steering stability if, in addition to the criteria set forth in i) and ii) above, iii) the total value of the three evaluation indexes for steering stability on snow, wet steering stability, and wear resistant was 314 or higher, and iv) there was a difference of no more than 10 between the evaluation indexes for steering stability on snow and wet steering stability, and the evaluation index for wear resistance.

As shown in Tables 2 and 3, there was a high balance between wear resistance, and steering stability on snow and wet steering stability when the length of the continuous land portions in the tire width direction (L52a, L54a in FIG. 5) was from 10 to 25% of the ground contact width of the regions of the shoulder land portions, the length of the inner regions in the tire width direction was from 35 to 65%, and the length of the outer regions in the tire width direction was from 20 to 45% (Working Examples 1, 3, 4, 6 to 9, 11 to 13).

TABLE 4

|  | Working Example 14 | Working Example 15 | Working Example 16 | Working Example 17 |
|---|---|---|---|---|
| Angle of inclination of closed wall portion (°) | 10 | 15 | 35 | 60 |
| Angle of inclination of stepped portion (°) | 10 | 15 | 35 | 60 |
| Steering stability on snow | 104 | 103 | 103 | 102 |
| Wet steering stability | 104 | 103 | 103 | 102 |
| Wear resistance | 102 | 103 | 104 | 106 |

As shown in Table 4, there was a superior balance between wear resistance, and steering stability on snow and wet steering stability when the angles of inclination of the closed wall portions and the stepped portions (θ and δ in FIG. 4) were inclined from 10 to 60° outward in the tire width direction with respect to the direction opposite the direction of the normal line of the tread surface (Working Examples 14 to 17).

TABLE 5

|  | Working Example 1 | Working Example 18 | Working Example 19 |
|---|---|---|---|
| Depth of inner region/depth of main groove (%) | 40 | 60 | 40 |
| Depth of outer region/depth of main groove (%) | 85 | 85 | 85 |
| Depth of shoulder sipe/depth of main groove (%) | 60 | 40 | 60-70 |
| Steering stability on snow | 106 | 108 | 110 |
| Wet steering stability | 106 | 108 | 110 |
| Wear resistance | 103 | 103 | 105 |

There was deemed to be a high balance between wear resistance, and steering stability on snow and wet steering stability when, in addition to the criteria set forth in i) to iv) above, v) the difference between steering stability on snow and wet steering stability and wear resistant was 3 or less.

As shown in Table 5, there was a higher balance between wear resistance, and steering stability on snow and wet steering stability when the sipe depth of the shoulder sipes was less than the groove depth of the outer regions of the shoulder lug grooves and greater than the groove depth of the interior region (Working Example 1). In Working Example 19, the shoulder sipes were formed so as to grow progressively shallower from the regions closer to outer circumferential main grooves toward the shoulder lug grooves, and the groove floors of the shoulder sipes were formed so as to extend in straight lines from the outer circumferential main groove toward the shoulder lug grooves.

TABLE 6

|  | Working Example 20 | Working Example 21 | Working Example 22 | Working Example 23 | Working Example 24 |
| --- | --- | --- | --- | --- | --- |
| Groove depth in inner region of shoulder lug groove/groove depth of outer circumferential main groove (%) | 15 | 20 | 40 | 60 | 65 |
| Steering stability on snow | 103 | 105 | 106 | 106 | 106 |
| Wet steering stability | 103 | 105 | 106 | 106 | 106 |
| Wear resistance | 104 | 104 | 103 | 102 | 101 |

In Table 6, "Groove depth in inner region of shoulder lug groove/groove depth of outer circumferential main groove" indicates the ratio of the groove depth of the inner region of the shoulder lug grooves to the groove depth of the outer circumferential main grooves.

As shown in Table 6, there was a high balance between wear resistance, and steering stability on snow and wet steering stability when the groove depth of the inner regions of the shoulder lug grooves was from 20 to 60% of the groove depth of the outer circumferential main groove (Working Examples 21 to 23).

TABLE 7

|  | Working Example 25 | Working Example 26 | Working Example 27 | Working Example 28 | Working Example 29 |
| --- | --- | --- | --- | --- | --- |
| Widthwise length of inner region of shoulder lug grooves/overall widthwise length (%) | 25 | 30 | 50 | 70 | 75 |
| Steering stability on snow | 106 | 106 | 106 | 105 | 103 |
| Wet steering stability | 106 | 106 | 106 | 105 | 103 |
| Wear resistance | 101 | 102 | 103 | 104 | 104 |

In Table 7, "Widthwise length of inner region of shoulder lug groove/overall widthwise length" indicates the ratio of the length of the inner regions of the shoulder lug grooves in the tire width direction to the length of the shoulder lug grooves in the tire width direction.

As shown in Table 7, there was a high balance between wear resistance, and steering stability on snow and wet steering stability when the length of the inner regions of the shoulder lug grooves in the tire width direction was from 30 to 70% of the length of the shoulder lug grooves in the tire width direction (Working Examples 26 to 28).

TABLE 8

|  | Working Example 30 | Working Example 31 | Working Example 32 | Working Example 33 | Working Example 34 |
| --- | --- | --- | --- | --- | --- |
| Groove depth of circumferential groove | 1 mm | 2 mm | 2 mm <, < outer region | 2 mm <, = outer region | 2 mm <, > outer region |
| Steering stability on snow | 103 | 105 | 106 | 106 | 106 |
| Wet steering stability | 103 | 105 | 106 | 106 | 106 |
| Wear resistance | 104 | 104 | 103 | 102 | 101 |

In Table 8, "2 mm<" indicates that the groove depth of the circumferential grooves is greater than 2 mm, "outer region" refers to the groove depth of the outer regions of the shoulder lug grooves, and the neighboring equal sign or unequal sign indicates relationship thereof to the groove depth of the circumferential grooves.

As shown in Table 8, there was a high balance between wear resistance, and steering stability on snow and wet steering stability when the groove depth of the narrow circumferential grooves was equal to or more than 2 mm and equal to or less than the groove depth of the outer regions of the shoulder lug grooves (Working Examples 31 to 33).

TABLE 9

|  | Working Example 35 | Working Example 36 | Working Example 37 | Working Example 38 | Working Example 39 |
| --- | --- | --- | --- | --- | --- |
| Groove length of central region of lug groove in center land portion/lug groove length (%) | 25 | 30 | 55 | 80 | 85 |
| Steering stability on snow | 106 | 106 | 106 | 105 | 103 |
| Wet steering stability | 106 | 106 | 106 | 105 | 103 |
| Wear resistance | 101 | 102 | 103 | 104 | 104 |

In Table 9, "Groove length of central region of lug groove in center land portion/lug groove length" indicates the ratio of the groove length of the central regions of the region of the lug grooves in the region of the center land portion to the groove length of the lug grooves.

As shown in Table 9, there was a high balance between wear resistance, and steering stability on snow and wet steering stability when the groove length of the central regions of the region of the lug grooves in the region of the center land portion was from 30 to 80% of the groove length of the lug grooves (Working Examples 36 to 38).

The foregoing has been a detailed description of the pneumatic tire of the present technology. However, the present technology is naturally not limited to the above embodiments, but may be improved or modified in various ways within the scope of the present technology.

What is claimed is:

1. A pneumatic tire having a tread pattern formed in a tread portion, wherein
    the tread pattern includes:
    two first circumferential main grooves parallel to a tire circumferential direction, the two first circumferential main grooves being disposed on both sides of a centerline of the tire in a tire width direction;

shoulder land portions formed in regions outside the first circumferential main grooves in the tire width direction;

shoulder lug grooves provided in regions of the shoulder land portions, the shoulder lug grooves extending from outer sides in the tire width direction toward the first circumferential main grooves, the shoulder lug grooves being closed off midway without connecting with the first circumferential main grooves, and the shoulder lug grooves including first regions and second regions, the second regions disposed in regions closer to the first circumferential main grooves than the first regions and having a shallower groove depth than the first regions;

shoulder sipes formed in the regions of the shoulder land portions, the shoulder sipes being connected to the second regions of the shoulder lug grooves, and the shoulder sipes extending toward the first circumferential main grooves;

narrow circumferential grooves formed in the regions of the shoulder land portions, the narrow circumferential grooves extending in the tire circumferential direction, and the narrow circumferential grooves having a narrower groove width than the shoulder lug grooves;

the narrow circumferential grooves intersecting with the second regions of the shoulder lug grooves;

the shoulder sipes have a sipe depth greater than the groove depth of the second regions of the shoulder lug grooves; and outer ends of the shoulder sipes in the tire width direction are formed by extending into at least a part of regions of the second regions of the shoulder lug grooves.

2. The pneumatic tire according to claim 1, wherein with respect to a ground contact width of the regions of the shoulder land portions in a ground contact width of the tire,
a length in the tire width direction of land portions between closed ends of the shoulder lug grooves and edges of the first circumferential main grooves is from 10 to 25%,
a length in the tire width direction of the second regions of the shoulder lug grooves is from 35 to 65%, and
a length in the tire width direction of the first regions of the shoulder lug grooves is from 20 to 45%.

3. The pneumatic tire according to claim 2, wherein the shoulder lug grooves further include closed wall portions extending so as to connect floors of the grooves in the second regions and a tread surface, and stepped portions connecting floors of the grooves in the first regions and the floors of the grooves in the second regions, and
the closed wall portions and the stepped portions are each inclined from 10 to 60° outward in the tire width direction with respect to a direction opposite the direction of a normal line of the tread surface.

4. The pneumatic tire according to claim 1, wherein the shoulder lug grooves further include closed wall portions extending so as to connect floors of the grooves in the second regions and a tread surface, and stepped portions connecting floors of the grooves in the first regions and the floors of the grooves in the second regions, and
the closed wall portions and the stepped portions are each inclined from 10 to 60° outward in the tire width direction with respect to a direction opposite the direction of a normal line of the tread surface.

5. The pneumatic tire according to claim 4, wherein the shoulder sipes have a sipe depth less than the groove depth of the first regions of the shoulder lug grooves and greater than the groove depth of the second regions.

6. The pneumatic tire according to claim 4, wherein the shoulder sipes have a sipe depth growing progressively shallower from the regions closer to the first circumferential main grooves toward the shoulder lug grooves.

7. The pneumatic tire according to claim 6, wherein the second regions of the shoulder lug grooves have a groove depth less than the groove depth of the first circumferential main grooves.

8. The pneumatic tire according to claim 7, wherein the second regions of the shoulder lug grooves have a length in the tire width direction being from 30 to 70% of the length of the shoulder lug grooves in the tire width direction.

9. The pneumatic tire according to claim 8, wherein the narrow circumferential grooves have a groove depth equal to or less than the groove depth of the first regions of the shoulder lug grooves.

10. The pneumatic tire according to claim 9,
wherein the tread pattern further comprises:
second circumferential main grooves disposed between the two first circumferential main grooves and the second circumferential main grooves defining a center land portion, the centerline of the tire passing therethrough, and
a plurality of lug grooves traversing a region of the center land portion and regions of two intermediate land portions defined by the first circumferential main grooves and the second circumferential main grooves to form a plurality of land portion blocks in the region of the center land portion and the regions of the intermediate land portions;
wherein
at least one of the lug grooves provided in the region of the center land portion and the lug grooves provided in the regions of the intermediate land portions include first lug groove regions being a part of regions in a direction of extension and second lug groove regions connecting with the first lug groove regions and the second lug groove regions are the other regions in the direction of extension; and
the first lug groove regions have a narrower groove width than the second lug groove regions and a shallower groove depth than the second lug groove regions.

11. The pneumatic tire according to claim 1, wherein the shoulder sipes have a sipe depth less than the groove depth of the first regions of the shoulder lug grooves and greater than the groove depth of the second regions.

12. The pneumatic tire according to claim 1, wherein the shoulder sipes have a sipe depth growing progressively shallower from the regions closer to the first circumferential main grooves toward the shoulder lug grooves.

13. The pneumatic tire according to claim 1, wherein the second regions of the shoulder lug grooves have a groove depth less than the groove depth of the first circumferential main grooves.

14. The pneumatic tire according to claim 1, wherein the second regions of the shoulder lug grooves have a length in the tire width direction being from 30 to 70% of the length of the shoulder lug grooves in the tire width direction.

15. The pneumatic tire according to claim 1, wherein narrow circumferential grooves have a groove depth equal to or less than the groove depth of the first regions of the shoulder lug grooves.

16. The pneumatic tire according to claim 1,
wherein the tread pattern further comprises:
second circumferential main grooves disposed between the two first circumferential main grooves and the second circumferential main grooves defining a center land portion, the centerline of the tire passing therethrough, and
a plurality of lug grooves traversing a region of the center land portion and regions of two intermediate land portions defined by the first circumferential main grooves and the second circumferential main grooves to form a plurality of land portion blocks in the region of the center land portion and the regions of the intermediate land portions;
wherein
at least one of the lug grooves provided in the region of the center land portion and the lug grooves provided in the regions of the intermediate land portions include first lug groove regions being a part of regions in a direction of extension and second lug groove regions connecting with the first lug groove regions and the second lug groove regions are the other regions in the direction of extension; and
the first lug groove regions have a narrower groove width than the second lug groove regions and a shallower groove depth than the second lug groove regions.

17. The pneumatic tire according to claim 16, wherein the first lug groove regions at the lug grooves in the region of the center land portion have a groove length being from 30 to 80% of the groove length of the lug grooves.

18. The pneumatic tire according to claim 16, wherein the shoulder lug grooves have a groove width greater than the widest groove width of the second lug groove regions of the lug grooves in the region of the center land portion and the groove width of the second lug groove regions of the lug grooves in the regions of the intermediate land portions.

* * * * *